US006576881B2

(12) United States Patent
Muthu et al.

(10) Patent No.: US 6,576,881 B2
(45) Date of Patent: Jun. 10, 2003

(54) METHOD AND SYSTEM FOR CONTROLLING A LIGHT SOURCE

(75) Inventors: Subramanian Muthu, Ossining, NY (US); Arjen Van Der Sijde, Goorstraatt (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 250 days.

(21) Appl. No.: 09/827,629

(22) Filed: Apr. 6, 2001

(65) Prior Publication Data

US 2002/0195541 A1 Dec. 26, 2002

(51) Int. Cl.[7] .................................................. G01J 1/32
(52) U.S. Cl. ........................ 250/205; 250/226; 356/405
(58) Field of Search ................................ 250/205, 226, 250/214 R, 214.1, 206; 356/405–408, 416–420, 425, 451

(56) References Cited

U.S. PATENT DOCUMENTS 4,402,611 A * 9/1983 Yuasa ......................... 356/405
5,272,518 A 12/1993 Vincent
5,319,437 A 6/1994 Van Aken et al.
5,754,448 A 5/1998 Edge et al.
5,755,742 A 5/1998 Schuelke et al. ............. 607/27
5,850,472 A 12/1998 Alston et al.
6,057,925 A 5/2000 Anthon
6,070,100 A 5/2000 Bakels et al. .................. 607/9
6,205,244 B1 3/2001 Bawolek et al. ............ 382/162

FOREIGN PATENT DOCUMENTS

EP 1067825 A2 10/2001

* cited by examiner

*Primary Examiner*—Que T. Le

(57) ABSTRACT

A light output control system for implementing a method for sensing the tri-stimulus values for controlling a light output illuminated from an LED based luminary is disclosed. The system comprises one or more filter/photo diode sensors for sensing a first set of tri-stimulus values of the light output and providing signals indicative thereof. The signals are utilized in a transformation matrix whereby a second set of tri-stimulus values is obtained. The system controls the light output as a function of the second set of tri-stimulus values.

18 Claims, 5 Drawing Sheets

METHOD AND SYSTEM FOR CONTROLLING A LIGHT SOURCE

BACKGROUND OF THE INVENTION

1. Field of the Invention

The present invention generally relates to controlling a luminary. The present invention specifically relates to sensing tri-stimulus values for a feedback control of a light output illuminating from a luminary including a plurality of light emitting diodes (LEDs) illuminating various colors of light.

2. Description of the Related Art

White light generation based on a Red LED, Green LED, and Blue LED (RGB LED) is well known in the art. It is also known that, even when produced from the same fabrication process, the optical characteristics of individual RGB LED can significantly vary in a batch. In addition, the characteristics of the LEDs vary with the forward current, ambient temperature, and aging. As a result, the quality of white light produced by each individual RGB LED based luminary will vary. Thus, to minimize, if not to eliminate, the quality variance of white light produced by a RGB LED based luminary, a feedback control system is required to establish and constantly maintain both a color (defined by a standard calorimetric system such as Commission International de l'Eclairage (CIE) 1931 chromaticity coordinates) and a lighting level of the RGB LED based luminary at standard levels.

Accordingly, the feedback control system must receive signals indicative of an actual color and an actual lighting level of a RGB LED based luminary in order to control the color temperature and the lighting level. Sensors including filters and photo diodes, which matches the color matching functions in a standard calorimetric system such as CIE 1931 xy color space, can produce such signals for the feedback control system. However, such sensors are extremely difficult and very expensive to manufacture, and are therefore commercially unfeasible. Thus, prior to the present invention, the realization of a required feedback control system for RGB LED based luminary was not attainable.

SUMMARY OF THE INVENTION

The present invention relates to a method and system for sensing the tri-stimulus values for controlling a luminary including LEDs, particularly RGB LEDs. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

A first form of the present invention is a method for controlling a light output illuminating from a luminary including two or more light emitting diodes. A first set of tri-stimulus values of the light output is sensed. The first set of tri-stimulus values is transformed into a second set of tri-stimulus values. The second set of tri-stimulus values are representative of a standard calorimetric system. The light output are controlled as a function of the second set of tri-stimulus values.

A second form of the present invention is a method of selectively employing a set of sensors within a light output control system. A first set of tri-stimulus values and a first set of xy coordinates and lumens of light output illuminating from a luminary including two or more light emitting diodes is measured. The standard color space such as CIE 1931 color space is used for this purpose. A second set of tri-stimulus values of the light outputs are sensed by a plurality of sensors. Coefficients of a transformation matrix are computed as a function of the first set of tri-stimulus values and the second set of tri-stimulus values. The sensors are rejected when the transformation matrix contains complex numbers. The first set of xy coordinates and lumens and a second set of xy coordinates and lumens, which are determined by an application of the transformation matrix on the second set of tri-stimulus values, are compared when the transformation matrix is linear. The sensors are rejected when a differential error between the first set of xy coordinates and lumens and the second set of xy coordinates and lumens exceeds a maximum error limit. The set of sensors is employed in the light output control system when the transformation matrix is linear and the differential error between the first set of xy coordinates and the second set of xy coordinates is within the maximum error limit.

A third form of the present invention is a system for controlling a light output illuminating from a luminary including one or more light emitting diodes. The system comprises a plurality of sensors, and a controller. The sensors are operable to sense a first set of tri-stimulus values of the light output and to provide a plurality of signals indicative of the first set of tri-stimulus values to the controller. The controller is operable to transform the first set of tri-stimulus values to a second set of tri-stimulus values and to determine a set of xy coordinates and lumens of the light output as a function of the second set of tri-stimulus values.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1A:
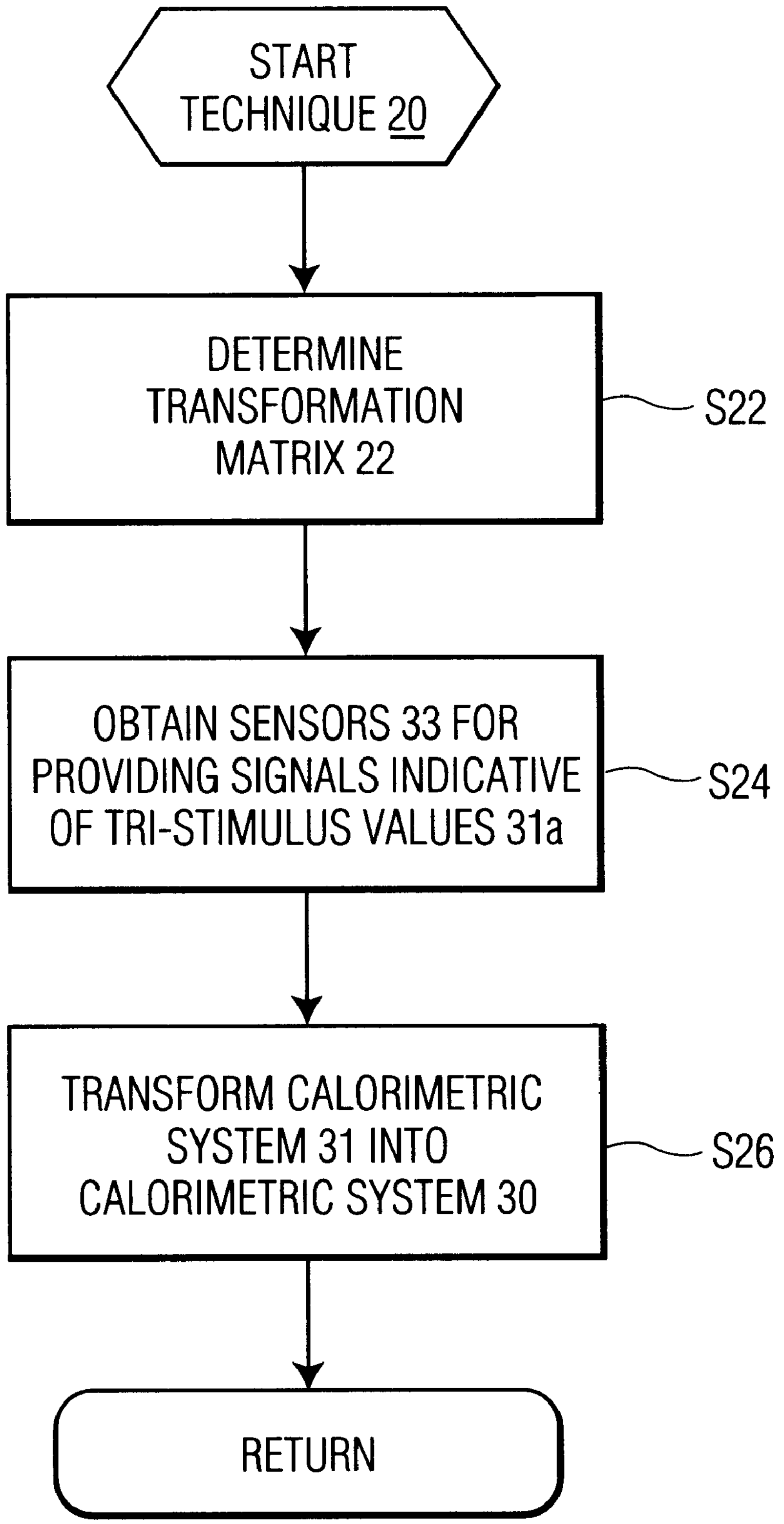
FIG. 1A is a flow chart of a transformation technique in accordance with the present invention.
Figure 1B:
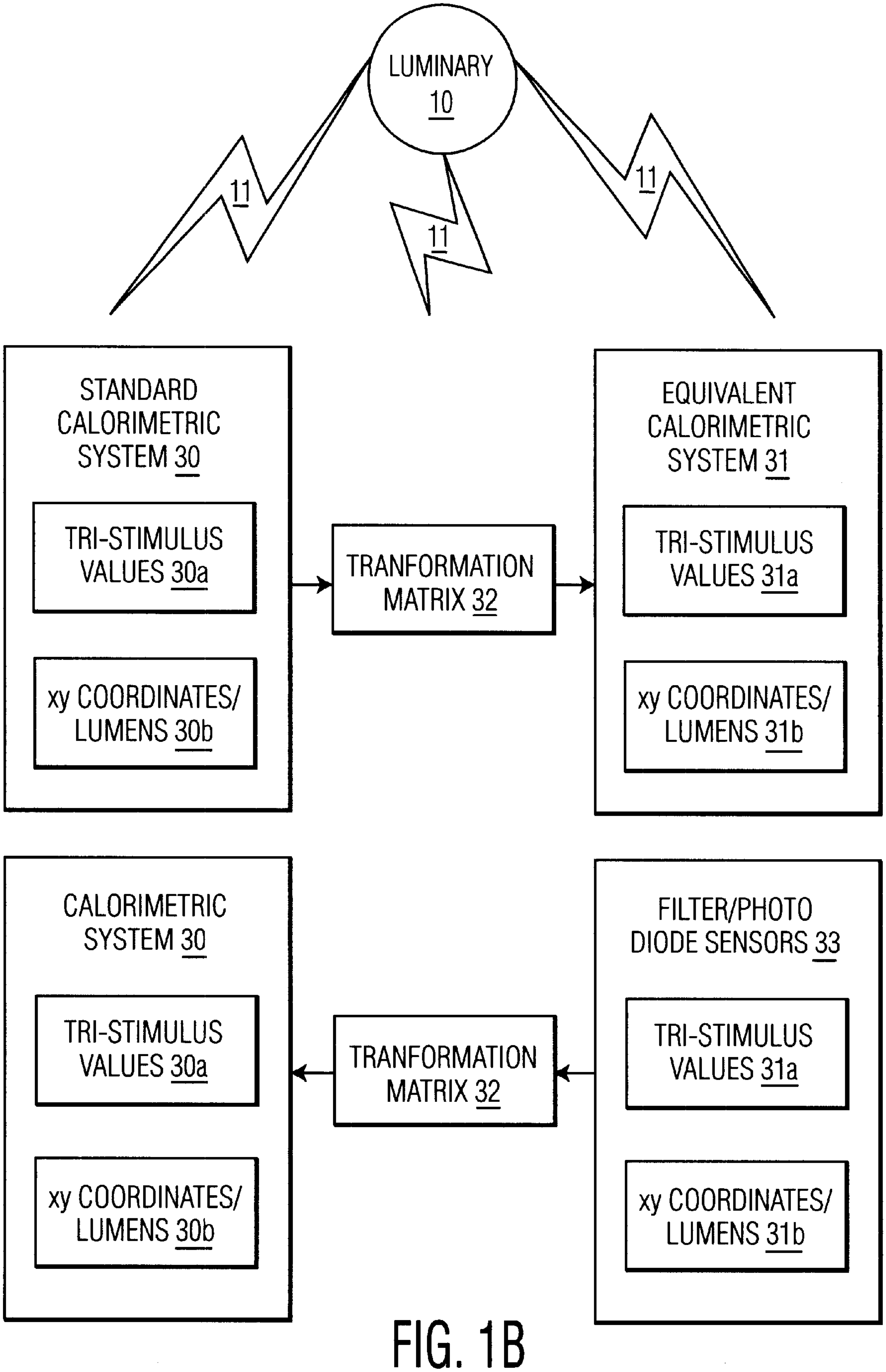
FIG. 1B is an exemplary transformation block diagram illustrating an implementation of the FIG. 1A transformation technique.

FIG. 1A illustrates a transformation technique 20 in accordance with the present invention, and FIG. 1B illustrates the principles of technique 20.

Referring to FIGS. 1A and 1B, manufacturing conventional filter/photo diode sensors 33 to match the color matching functions of a standard calorimetric system 30 for a given accuracy is difficult and therefore, such filter/photo diode sensors 33 are not commercially available to directly sense the tri-stimulus and chromaticity coordinates of a standard calorimetric system. Transformation technique 20 overcomes this problem. During a stage S22 of technique 20, a transformation matrix 22 for transforming standard calorimetric system 30 into an equivalent calorimetric system 31 having color matching functions that can be used to sense by some, if not all, conventional filter/photo diode sensors 33.

In one embodiment, calorimetric system 30 is a Commission International de l'Eclairage (CIE) color measurement system expressed in terms of color matching functions including a tri-stimulus values 30*a* and a xy coordinates and lumens 30*b*. Additionally, calorimetric system 31 is a RGB LED based color measurement system expressed in terms of a tri-stimulus values 31*a* and a xy coordinates and lumens 31*b* that are equivalent to tri-stimulus values 30*a* and xy coordinates and lumens 30*b*. The transformation matrix 32 is in accordance with the following equation [1]:

$$[T]=[XYZ]^T_{3XM}\cdot[RGB]_{MX3}\cdot\text{inv}\{([RGB]^T_{3XM}\cdot[RGB]_{MX3})\} \quad [1]$$

where T is a transformation matrix 32; X, Y and Z are tri-stimulus values 30*a* of the system 30; and R, G and B are tri-stimulus values 31*a* of system 31; M is the number of measurement samples, which is greater than or equal to three.

Filter/photo diode sensors 33 that are operative to provide signals indicative of tri-stimulus values 31*a* or an acceptable approximation thereof are obtained during a stage S24 of technique 20. In one embodiment, a sensor selection routine 40 as shown in FIG. 1C is implemented to properly select filter/photo diode sensors 33 with the required operational capabilities.

Figure 1C:
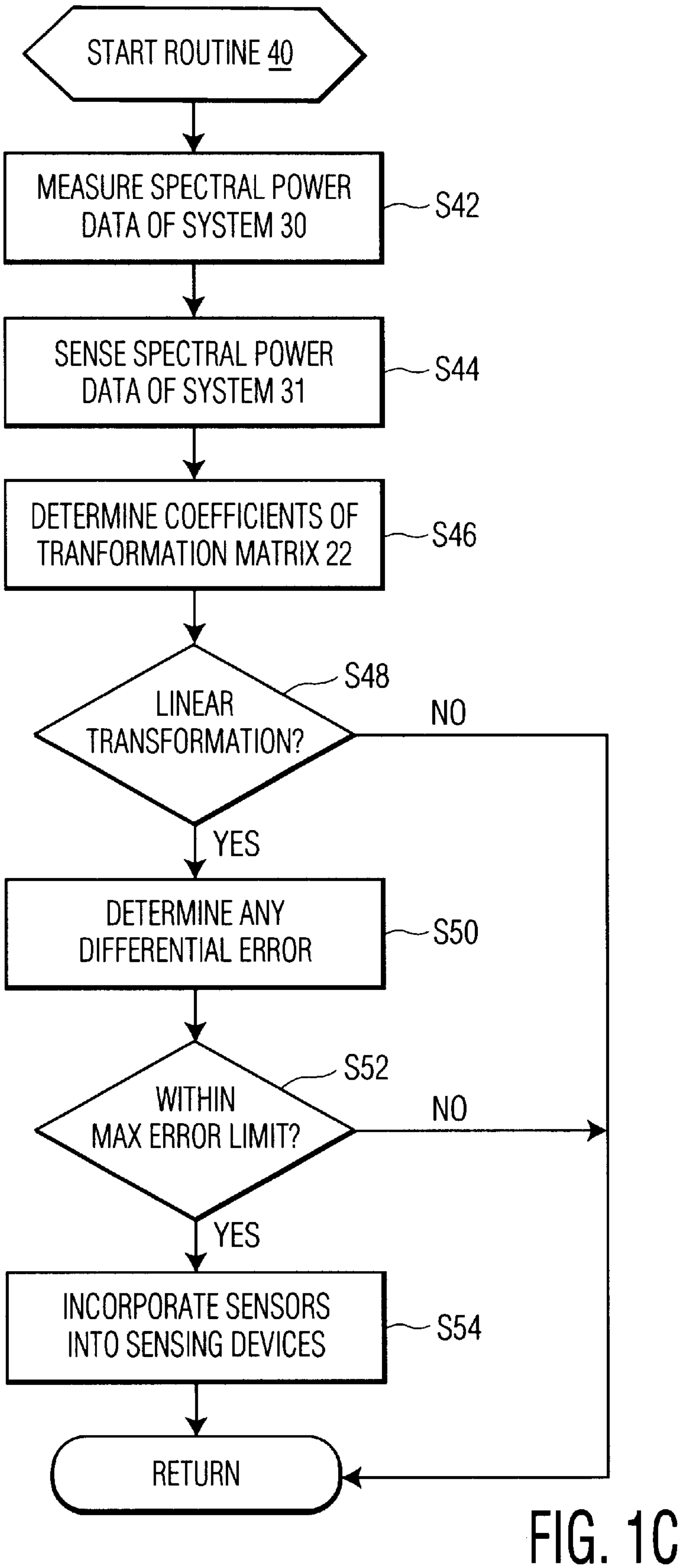
FIG. 1C is a flow chart of one embodiment of a sensor selection routine in accordance with the present invention.

Referring additionally to FIG. 1C, during a stage S42 of routine 40, tri-stimulus values 30*a* and xy coordinates and lumens 30*b* are determined. In one embodiment, light output 11 is illuminated from multiple RGB LED based luminaries 10 whereby tri-stimulus values 30*a* and xy coordinates and lumens 30*b* are measured by a conventional spectrometer. During a stage S44 of routine 40, N number of filter/photo diode sensors 33 are operated to sense light output 11 illuminating from RGB LED based luminaries 10 to thereby provide signals indicative of tri-stimulus values 31*a* and xy coordinates and lumens 31*b*. During a stage S46 of routine 40, coefficients of transformation matrix 32 are determined by an execution of equation [1] with the tri-stimulus values 30*a* as measured during stage S42 and the tri-stimulus value 31*a* as sensed during stage S44 serving as input values for matrix 22.

The following TABLE 1 illustrates exemplary measurements during stage S42 and stage S44 involving five (5) RGB LED based luminaries 10, and an average of tri-stimulus values 31*a* sensed by three filter/photo diodes sensors 33:

TABLE 1

| LUMINARIES | TRI-STIMULUS VALUES 30a | | | TRI-STIMULUS VALUES 31a | | |
|---|---|---|---|---|---|---|
| 10 | X | Y | Z | R | G | B |
| 1 | 5.6872 | 3.0260 | 33.224 | 356.635 | 1038.7 | 1752.1 |
| 2 | 6.0465 | 4.2065 | 36.649 | 413.283 | 1357.8 | 2015.1 |
| 3 | 5.8046 | 4.3627 | 35.444 | 402.296 | 1378.7 | 1972.1 |
| 4 | 4.8144 | 4.6453 | 30.531 | 369.840 | 1397.4 | 1779.3 |
| 5 | 3.9970 | 4.5803 | 25.677 | 332.097 | 1321.2 | 1550.4 |

The resulting coefficients of transformation matrix 22 from TABLE 1 is:

$$[T]=\begin{matrix} 8.7823 & -2.935 & 3.1918 \\ 5.4023 & 4.5093 & -2.0497\times10^{-3} \\ 2.6367 & -9.3567 & 23.9657 \end{matrix}$$

During a stage S48 of routine 40, it is determined if the transformation matrix 22 is linear, i.e., are any of the resulting coefficients complex numbers. If any of the resulting coefficients are complex numbers, then the filter/photo diode sensors 33 operated during stage S44 are rejected and routine 40 is terminated. If none of the resulting coefficients are complex numbers as with the example of transformation matrix 22 from TABLE 1, then routine 40 is proceeded to a stage S50 of routine 40 whereby each individual filter/photo diode sensors 33 is operated to sense light output 11 from each multiple RGB LED based luminary 10 to thereby provide signals indicative of tri-stimulus values 31*a*.

During a stage S52 of routine 40, the xy coordinates and lumens obtained by applying the transformation matrix on 31*a* as provided by a filter/photo diode sensor 33 during stage S50 are compared to the xy coordinates and lumens 30*b* as measured during stage S42 to determine if a differential error between the first xy coordinates and the xy coordinates 30*b* are within or exceed a maximum error limit. The following TABLE 2 illustrates exemplary differential errors between the xy coordinates 30*b* and the xy coordinates 31*b*:

TABLE 2

| LUMANARIES | xy COORDINATES 30b | | xy COORDINATES (after transformation) | | ERROR IN UV |
|---|---|---|---|---|---|
| 10 | x | $y_r$ | x | $y_r$ | SPACE |
| 1 | 0.1356 | 0.0722 | 0.1354 | 0.0720 | 0.2120e-3 |
| 2 | 0.1289 | 0.0897 | 0.1293 | 0.0899 | 0.2378e-3 |
| 3 | 0.1273 | 0.0956 | 0.1269 | 0.0955 | 0.4656e-3 |
| 4 | 0.1204 | 0.1162 | 0.1206 | 0.1163 | 0.5976e-3 |
| 5 | 0.1167 | 0.1337 | 0.1165 | 0.1336 | 0.2717e-3 |

During a stage S54 of routine 40, a filter/photo diode sensor 33 is employed with a system for controlling light output 11 when each of the readings is within the acceptable limit. Otherwise, routine 40 terminates.

Figure 2A:
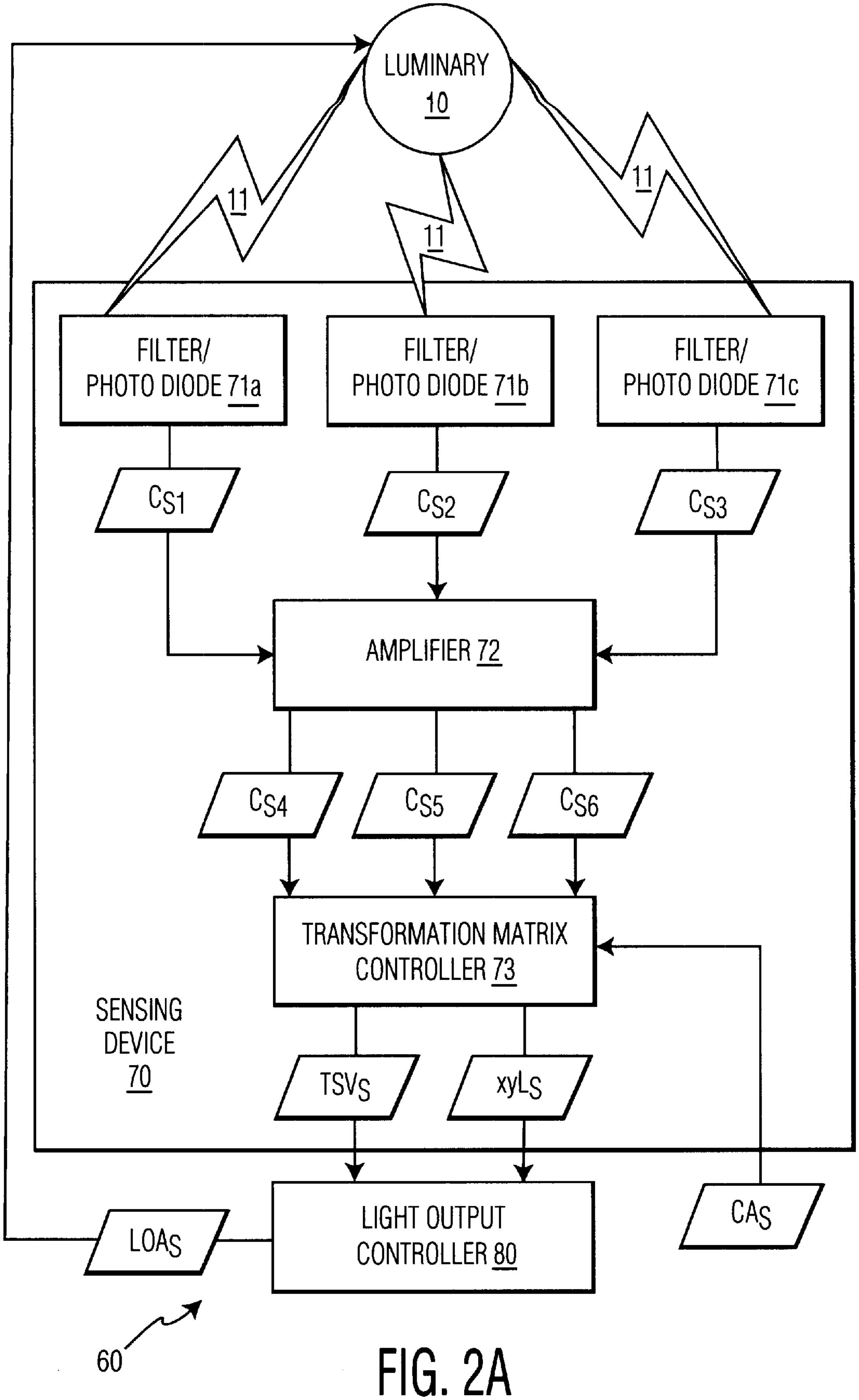
FIG. 2A is a block diagram of one embodiment of a light source sensing system in accordance with the present invention.
Figure 2B:
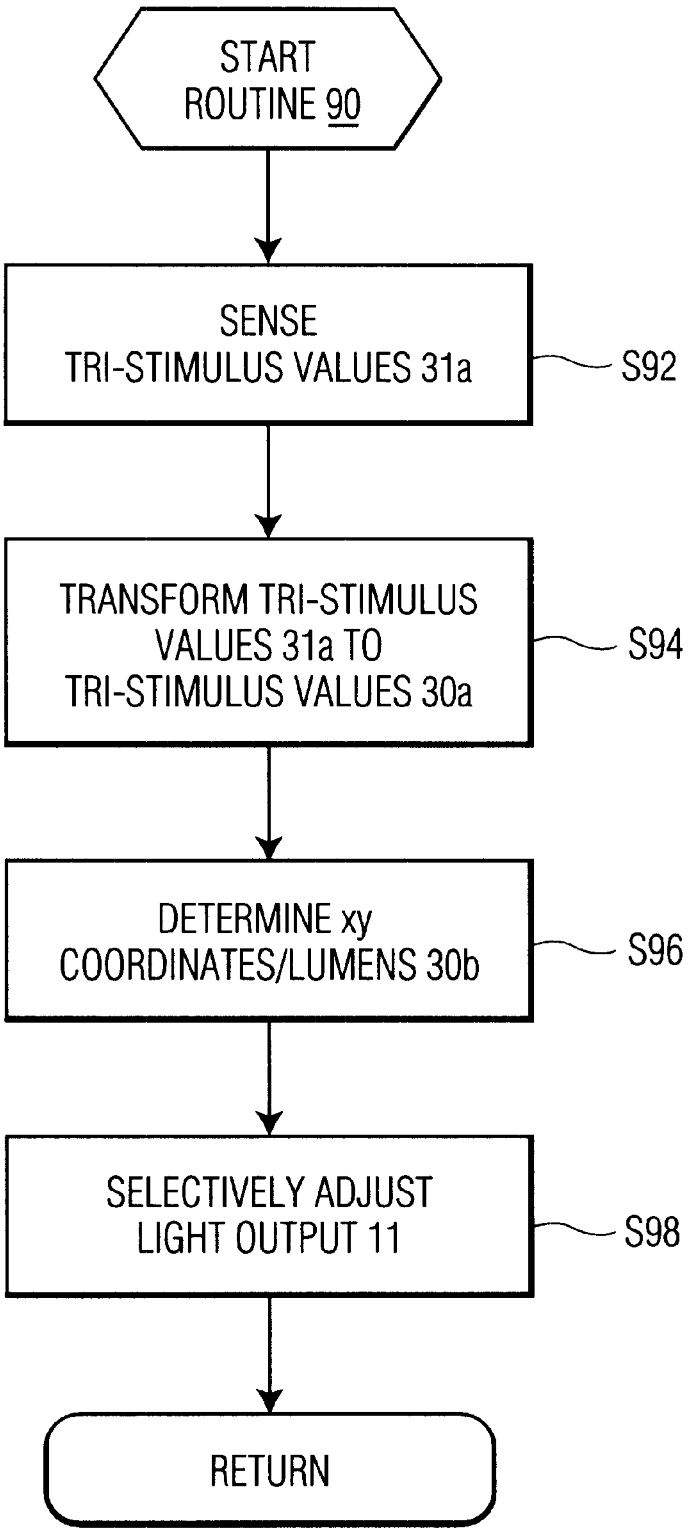
FIG. 2B is a flow chart of one embodiment of an operating routine of the FIG. 2A light source sensing system in accordance with the present invention.

FIG. 2A illustrates a light output control system 60, and FIG. 2B illustrates an operating routine 90 implemented by system 60 for controlling an illumination of light output 11 from RGB LED based luminary 10. From the following description of system 60 and routine 90, those having ordinary skill in the art will appreciate the functionality of system 60 and routine 90 as applied to any LED based luminary such as, for example, a luminary including a Orange LED and a Blue LED.

Referring to FIGS. 2A and 2B, system 60 comprises a sensing device 70 and a light output controller 80. Sensing device 20 includes a color sensor 71*a*, a color sensor 71*b*, a color sensor 71*c*, an amplifier 72, and a transformation matrix controller 73 In one embodiment, sensing device 70 is manufactured as a single-chip.

Color sensors 71*a*–71*c* are conventional filter/photo diode combinations employed in accordance with routine 40 for sensing tri-stimulus values 31*a* (FIG. 1B) of light output 11 during a stage S92 of routine 90. In the illustrated embodiment, color sensor 71*a* provides a color signal $C_{S1}$ in analog form to amplifier 72 in response to a light output 11. Color sensor 71*b* provides a color signal $C_{S2}$ in analog form to amplifier 72 in response to light output 11. Color sensor 71*c* provides a color signal $C_{S3}$ in analog form to amplifier 72 in response to light output 11. Color signal $C_{S1}$, color signal $C_{S2}$, and color signal $C_{S3}$ collectively indicate tri-stimulus values 31*a*.

Amplifier 72 includes analog and/or digital circuitry for providing a color signal $C_{S4}$ in analog form as an amplification of color signal $C_{S1}$ to controller 73, a color signal $C_{S5}$ in analog form as an amplification of color signal $C_{S2}$ to controller 73, and a color signal $C_{S6}$ in analog form as an amplification of color signal $C_{S3}$ to controller 73. Amplifier 72 can be omitted from embodiments of sensing device 70 when color sensor 71*a* is operable to provide color signal $C_{S1}$ at a required analog level for transformation controller 73, color sensor 71*b* provides color signal $C_{S2}$ at a required analog level for transformation controller 73, and color sensor 71*c* provides color signal $C_{S3}$ at a required analog level for transformation controller 73.

Transformation controller 73 is an electronic circuit comprised of one or more components that are assembled as a common unit. Transformation controller 73 may be comprised of analog circuitry, and/or digital circuitry. Also, transformation controller 73 may be programmable, a dedicated state machine, or a hybrid combination of programmable and dedicated hardware. To implement the principals of the present invention, transformation controller 73 can further include any control clocks, interfaces, signal conditioners, filters, Analog-to-Digital (A/D) converters, Digital-to-Analog (D/A) converters, communication ports, or other types of operators as would occur to those having ordinary skill in the art.

In the illustrated embodiment, transformation controller 73 includes an Analog-to-Digital (A/D) converter (not shown), an integrated processing unit (not shown), and a solid-state memory device (not shown). The memory contains programming of transformation matrix 22 (FIG. 1B). In the illustrated embodiment, a coefficient adjustment signal $CA_S$ can be optionally provided to controller 73 by an external source (not shown) during an optional stage of S94 of routine 90 whereby the coefficients of matrix 22 are adjusted as needed.

In response to color signal $C_{S4}$, color signal $C_{S5}$, and color signal $C_{S6}$, controller 73 executes transformation matrix 22 during stage S94 to transform tri-stimulus values 31*a* (FIG. 1B) to tri-stimulus values 30*a* and thereafter proceeds to a stage S96 of routine 90 to conventionally computes xy coordinates and lumens 30*b* (FIG. 1B) of light output 11 as a function of tri-stimulus values 30*a*. From the transformation and computation, controller 73 provides a tri-stimulus values signal $TSV_S$ in digital form as an indication of tri-stimulus values 30*a* of light output 11 to light output controller 80, and a xy coordinates and lumen signal $xyL_S$ in digital form as an indication of xy coordinates and lumen 30*b* of light output 11 to light output controller 80.

Light output controller 80 is an electronic circuit comprised of one or more components that are assembled as a common unit. Light output controller 80 may be comprised of analog circuitry, and/or digital circuitry. Also, light source controller 80 may be programmable, a dedicated state machine, or a hybrid combination of programmable and dedicated hardware. To implement the principals of the present invention, light output controller 80 can further include any control clocks, interfaces, signal conditioners, filters, Analog-to-Digital (A/D) converters, Digital-to-Analog (D/A) converters, communication ports, or other types of operators as would occur to those having ordinary skill in the art. In response to tri-stimulus values signal $TSV_S$ and xy coordinates and lumens signal $xyL_S$, controller 80 selectively provides a light output adjustment signal $LOA_S$ to luminary 10 during a stage S98 of routine 90 whereby the optical characteristics of light output 11 are adjusted as necessary.

In alternative embodiments of system 60, controller 73 and controller 80 are integrated.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A method for controlling a light output illuminating from a luminary including at least one light emitting diode, said method comprising:

sensing a first set of tri-stimulus values of the light output;

transforming said first set of tri-stimulus values into a second set of tri-stimulus values, said second set of tri-stimulus values being representative of a standard calorimetric system; and controlling the light output as a function of the second set of tri-stimulus values.

2. The method of claim 1, further comprising:

measuring a third set of tri-stimulus values of a plurality of light outputs from a plurality of luminaries, each luminary including a plurality of light emitting diodes;

sensing a fourth set of tri-stimulus values of said plurality of light outputs;

determining a transformation matrix as a function of said second set of tri-stimulus values and said third set of tri-stimulus values; and applying the transformation matrix to said first set of tri-stimulus values to thereby transform said first set of tri-stimulus values to said second set of tri-stimulus values when said transformation matrix is linear.

3. The method of claim 2, further comprising:

positioning a plurality of sensors relative to said plurality of luminaries to thereby sense said fourth set of tri-stimulus values of said plurality of light outputs; and positioning at least two sensors of said plurality of sensors relative to the luminary to thereby sense said first set of tri-stimulus values of the light output.

4. The method of claim 1, further comprising:

measuring a third set of tri-stimulus values and a first set of xy coordinates and lumens of a plurality of light outputs from a plurality of luminaries, each luminary including a plurality of light emitting diodes;

sensing a fourth set of tri-stimulus values and a second set of xy coordinates and lumens of said plurality of light outputs;

determining a transformation matrix as a function of said second set of tri-stimulus values and said third set of tri-stimulus values; and applying the transformation matrix to said first set of tri-stimulus values to thereby transform said first set of tri-stimulus values to said second set of tri-stimulus values when said transformation matrix is linear and a differential error between said first set of xy coordinates and lumens and said second set of xy coordinates and lumens is within a maximum error limit.

5. The method of claim 4, further comprising:

positioning a plurality of sensors relative to said plurality of luminaries to thereby sense said fourth set of tri-stimulus values and said first set of xy coordinates and lumens of said plurality of light outputs; and positioning at least two sensors of said plurality of sensors relative to the luminary to thereby sense said first set of tri-stimulus values of the light output.

6. The method of claim 1, further comprising:

determining a first set of xy coordinates and lumens of the light output as a function of said second set of tri-stimulus values; and controlling the light output as a function of the second set of tri-stimulus values and the first set of xy coordinates and lumens.

7. The method of claim 6, further comprising:

measuring a third set of tri-stimulus values of a plurality of light outputs from a plurality of luminaries, each luminary including a plurality of light emitting diodes;

sensing a fourth set of tri-stimulus values of said plurality of light outputs;

determining a transformation matrix as a function of said second set of tri-stimulus values and said third set of tri-stimulus values; and applying the transformation matrix to said first set of tri-stimulus values to thereby transform said first set of tri-stimulus values to said second set of tri-stimulus values when said transformation matrix is linear.

8. The method of claim 7, further comprising:

positioning a plurality of sensors relative to said plurality of luminaries to thereby sense said fourth set of tri-stimulus values; and positioning at least two sensors of said plurality of sensors relative to the luminary to thereby sense said first set of tri-stimulus values of the light output.

9. The method of claim 6, further comprising:

measuring a third set of tri-stimulus values and a second set of xy coordinates and lumens of a plurality of light outputs from a plurality of luminaries, each luminary including a plurality of light emitting diodes;

sensing a fourth set of tri-stimulus values and a third set of xy coordinates and lumens of said plurality of light outputs;

determining a transformation matrix as a function of said second set of tri-stimulus values and said third set of tri-stimulus values; and applying the transformation matrix to said first set of tri-stimulus values to thereby transform said first set of tri-stimulus values to said second set of tri-stimulus values when said transformation matrix is linear and a differential error between said second set of xy coordinates and lumens and said third set of xy coordinates and lumens is within a maximum error limit.

10. The method of claim 9, further comprising:

positioning a plurality of sensors relative to said plurality of luminaries to thereby sense said fourth set of tri-stimulus values and said third set of xy coordinates and lumens of said plurality of light outputs; and positioning at least two sensors of said plurality of sensors relative to the luminary to thereby sense said first set of tri-stimulus values of the light output.

11. A method of selectively employing at least two sensors of a plurality of sensors within a light output control system, said method comprising:

measuring a first set of tri-stimulus values and a first set of xy coordinates and lumens of at least one light output;

operating the plurality of sensors to sense a second set of tri-stimulus values and a second set of xy coordinates and lumens of said at least one light output; and computing a transformation matrix as a function of the first set of tri-stimulus values and the second set of tri-stimulus values.

12. The method of claim 11, further comprising:

rejecting the plurality of sensors when said transformation matrix is nonlinear; and employing the at least two sensors of the plurality of sensors in the system when the transformation matrix is linear.

13. The method of claim 11, further comprising:

comparing said first set of xy coordinates and said second set of xy coordinates and lumens to obtain a differential error when said transformation matrix is linear;

rejecting the plurality of sensors when said differential error exceeds a maximum error limit; and employing the at least two sensors of the plurality of sensors in the system when the differential error is within a maximum error limit.

14. A method for controlling a light output illuminating from a luminary including a plurality of light emitting diodes, said method comprising:

sensing a first set of tri-stimulus values of the light output;

transforming said first set of tri-stimulus values into a second set of tri-stimulus values;

determining a set of xy coordinates and lumens as function of said set of tri-stimulus values; and controlling a color and a lighting level of the light output as a function of the second set of tri-stimulus values and said set of xy coordinates and lumens.

15. A system for controlling a light output illuminating from a luminary including a plurality of light emitting diodes, said system comprising:

a plurality of sensors operable to provide a first set of signals indicative of a first set of tri-stimulus values of the light output; and a first controller is operable to apply a transformation matrix to said first set of tri-stimulus values as indicated by said first set of signals to determine a second set of tri-stimulus values and a set of xy coordinates and lumens of the light output.

16. The system of claim 15, wherein said first controller is further operable to provide a signal to the luminary, said signal indicative of an adjustment of said light output in view of said second set of tri-stimulus values and said set of xy coordinates and lumens of the light output.

17. The system of claim 15, further comprising:

a second controller operable to provide a signal to the luminary, said signal indicative of an adjustment of said light output in view of said second set of tri-stimulus values and said set of xy coordinates and lumens of the light output; and wherein said first controller is further operable to provide a second set of signals indicative of said second set of tri-stimulus values and said set of xy and lumens coordinates to said second controller.

18. A computer program product in a computer readable medium, said computer program product for controlling a light output illuminating from a luminary, said computer program product comprising:

a first computer readable code for applying a transformation matrix to a first set of tri-stimulus values of the light output to determine a second set of tri-stimulus values and a set of xy coordinates and lumens of the light output; and a second computer readable code for controlling the light output as a function of said second set of tri-stimulus values and said set of xy coordinates and lumens of the light output.

* * * * *